(12) United States Patent
Zuo et al.

(10) Patent No.: US 11,758,856 B2
(45) Date of Patent: Sep. 19, 2023

(54) FULLY AUTOMATIC INTELLIGENT RUBBER TAPPING ROBOT

(71) Applicant: BEIJING UNIVERSITY OF TECHNOLOGY, Beijing (CN)

(72) Inventors: Guoyu Zuo, Beijing (CN); Guodong Chen, Beijing (CN); Daoxiong Gong, Beijing (CN); Zhihui Shen, Beijing (CN); Erjun Xiao, Beijing (CN)

(73) Assignee: BEIJING UNIVERSITY OF TECHNOLOGY, Beijing (CN)

( * ) Notice: Subject to any disclaimer, the term of this patent is extended or adjusted under 35 U.S.C. 154(b) by 0 days.

(21) Appl. No.: 18/126,481

(22) Filed: Mar. 27, 2023

(65) Prior Publication Data
US 2023/0225264 A1 Jul. 20, 2023

Related U.S. Application Data

(63) Continuation of application No. PCT/CN2021/098820, filed on Jun. 8, 2021.

(30) Foreign Application Priority Data

Sep. 30, 2020 (CN) .......................... 202011061013.1

(51) Int. Cl.
*G06F 17/00* (2019.01)
*A01G 23/12* (2006.01)
(Continued)

(52) U.S. Cl.
CPC .............. *A01G 23/12* (2013.01); *B25J 5/005* (2013.01); *B25J 15/0019* (2013.01); *G05D 1/021* (2013.01)

(58) Field of Classification Search
CPC ....... A01G 23/12; B25J 5/005; B25J 15/0019; G05D 1/021
(Continued)

(56) References Cited

U.S. PATENT DOCUMENTS 1,901,946 A * 3/1933 Bark ...................... A01G 23/12
30/280
6,353,814 B1 * 3/2002 Weng .................. G06F 18/2321
700/258
(Continued)

FOREIGN PATENT DOCUMENTS

CN 105052675 A 11/2015
CN 105494031 A * 4/2016
(Continued)

OTHER PUBLICATIONS

Rubber Tapping Robot or How the STM32WL Helped Triple Yields (Year: 2021).*
(Continued)

*Primary Examiner* — Ronnie M Mancho
(74) *Attorney, Agent, or Firm* — J.C. PATENTS

(57) ABSTRACT

The invention discloses a fully automatic intelligent rubber tapping robot, which comprises a moving platform and a rubber tapping robot arm. The rubber cutting mechanical arm is installed on the moving platform. tapping robot arm is installed on the moving platform. The tapping robot arm is specially designed for rubber cutting operation, the end of the tapping robot arm is equipped with an end actuator, which is composed of a tree-hugging fixed device and a sliding rubber tapping device. The invention can carry out the rubber cutting operation independently without manual intervention, which greatly reducing the manual input, and obviously improving the rubber cutting efficiency and time economy conversion efficiency. The movable system can work alone in a whole rubber forest with a large working area and reduces the average input cost per tree. The technical indexes of the rubber tree, such as cutting depth, cutting skin consumption and cutting smoothness, all meet
(Continued)

the requirements of traditional rubber cutting technology and have good popularization and application value.

5 Claims, 3 Drawing Sheets

(51) Int. Cl.
   *B25J 15/00*   (2006.01)
   *B25J 5/00*    (2006.01)
   *G05D 1/02*    (2020.01)
(58) Field of Classification Search
   USPC .......................................................... 701/51
   See application file for complete search history.

(56) References Cited

U.S. PATENT DOCUMENTS

| | | | | |
|---|---|---|---|---|
| 9,981,389 | B2* | 5/2018 | Kennedy | B62D 57/032 |
| 11,540,444 | B2* | 1/2023 | Salisbury | B25J 15/0616 |
| 2006/0213167 | A1* | 9/2006 | Koselka | A01B 51/026 |
| | | | | 56/10.2 A |
| 2009/0306825 | A1* | 12/2009 | Li | B25J 9/1669 |
| | | | | 700/261 |
| 2011/0137456 | A1* | 6/2011 | Koselka | A01B 51/026 |
| | | | | 701/532 |
| 2013/0006423 | A1* | 1/2013 | Ito | B25J 9/1612 |
| | | | | 901/46 |
| 2016/0008988 | A1* | 1/2016 | Kennedy | B25J 15/08 |
| | | | | 414/738 |
| 2018/0049380 | A1 | 2/2018 | Busby, IV | |
| 2021/0323174 | A1* | 10/2021 | Salisbury | A01D 46/30 |

FOREIGN PATENT DOCUMENTS

| | | | | | |
|---|---|---|---|---|---|
| CN | 106034980 | A | | 10/2016 | |
| CN | 108401838 | A | | 8/2018 | |
| CN | 208029769 | U | * | 11/2018 | |
| CN | 109247164 | A | | 1/2019 | |
| CN | 109328973 | A | | 2/2019 | |
| CN | 208543485 | U | | 2/2019 | |
| CN | 208572870 | U | | 3/2019 | |
| CN | 110122256 | A | * | 8/2019 | |
| CN | 111149651 | A | | 5/2020 | |
| CN | 111448967 | A | | 7/2020 | |
| CN | 111469149 | A | * | 7/2020 | A01G 23/10 |
| CN | 112335516 | A | | 2/2021 | |
| CN | 112335516 | A | * | 2/2021 | A01G 23/10 |
| CN | 113455332 | A | * | 10/2021 | |
| CN | 115553192 | A | * | 1/2023 | |
| IN | 201641009146 | A | * | 9/2016 | |
| JP | H09140277 | A | | 6/1997 | |

OTHER PUBLICATIONS

International Search Report of PCT/CN2021/098820.
Search Report of the priority application CN202011061013.1.

* cited by examiner

FULLY AUTOMATIC INTELLIGENT RUBBER TAPPING ROBOT

CROSS-REFERENCE TO RELATED APPLICATION

This application is a continuation of international application PCT/CN2021/098820 filed on Jun. 8, 2021, which claims priority to Chinese application No. 202011061013.1, filed on Sep. 30, 2020, the contents of the above identified applications are hereby incorporated by reference in its entirety and made a part of this specification.

TECHNICAL FIELD

The invention relates to the field of rubber tapping machines, in particular to a fully automatic intelligent tapping robot.

BACKGROUND

Natural rubber is a raw material of many rubber products. With the continuous development of science and technology, natural rubber products are more and more widely used in many aspects due to their excellent resilience, insulation, water resistance and plasticity, and become an important industrial resource. The demand of natural rubber is huge. Natural rubber flow from the laticifer in the bark of rubber trees, so as to obtain effective collection of natural rubber, this process is called rubber cutting.

Because of its high technical requirements, rubber tapping requires precise cutting of the rubber tree. It should not be too deep or too shallow. Mistakes in operation will lead to a reduction in rubber production. Therefore, most of the rubber tapping work has been carried out by experienced workers. However, the efficiency of manual operation by a single person is extremely slow. Often a rubber forest needs to invest a large number of rubber tapping workers, resulting in high labor costs. With fewer and fewer experienced workers, the gap between the demand and supply of rubber cutters in the rubber industry is widening. The best time to tap rubber is around three o'clock in the morning. Manual tapping is also a great burden on the human body, so there is an urgent need for a method that can replace manual tapping.

In recent years, with the advancement of science and technology, many agriculture is developing in the direction of automation and intelligence. It is becoming more and more common for agricultural robots to replace human labor, but the rubber tapping work has not changed much. Some hand-held rubber tapping knives and operational rubber tapping machines have appeared, but they have not solved the problem of excessive labor costs in rubber tapping. Developing a fully automatic intelligent tapping robot system can effectively solve this problem.

SUMMARY

The fundamental problem to be solved by the present invention is to provide an intelligent robot system for fully automatic rubber tapping in the rubber forest. The specific issues can be divided into the following points:

(1) The movement of the tapping robot in the forest, including the stability of the overall robot movement and the accuracy of reaching the work site.

(2) After arriving at the work site, the rubber tapping knife can be accurately placed at the position where the rubber needs to be tapped.

(3) There will be reaction force and vibration during the rubber tapping process, which need to be overcome.

(4) The thickness and height of each tree of the rubber tree are different, requiring the robot to have a certain adaptive ability.

(5) The rubber tapping track is an inclined arc shape, and the final rubber tapping trace produced by the robot needs to satisfy.

In order to solve the problems of the technologies described above, the present invention adopts the following technical solutions:

The overall solution of the present invention is, a fully automatic intelligent tapping robot, including a moving platform and a tapping robot arm; tapping robot arm is installed on the moving platform. The tapping robot arm is specially designed for rubber cutting operation, the end of the tapping robot arm is equipped with an end actuator, which is composed of a tree-hugging fixed device and a sliding rubber tapping device.

Moving platform adopts a crawler-type movement method, which can adapt to the complex ground environment of the rubber forest. The front and rear wheels are used to drive the body movement at the same time to ensure a stable driving force on uneven ground, and there are shock-absorbing wheels to make the crawler fit the ground as much as possible. In order to improve the running stability, several shock absorbers are installed at the same time. On the one hand, shock absorbers can reduce the bumps and vibrations generated during the operation of the rubber tapping robot, and on the other hand, they can reduce the working vibration transmitted to the body during the tapping process. The purpose of above is to provide a stable working platform for entire robot system.

Moving platform is equipped with a GPS positioning and navigation system, which can select accurate positioning, complete the autonomous navigation function according to the location information of the rubber tree to be tapped and the surrounding environment information, and help the robot to accurately arrive at the working place. In addition, the body is equipped with a rubber tapping robot arm specially designed for rubber tapping, and other related tools can also be mounted.

Among them, the rubber tapping robot arm adopts a four-degree-of-freedom structure to meet the working space requirements of the rubber tapping operation. The rubber tapping robot arm is installed on the electric rotary table on the moving platform, and the overall structure of the rubber tapping robot arm is composed of a vertical and a horizontal sliding module.

The rubber tapping robot arm contains four degrees of freedom, including: an overall rotational degree of freedom, adjusting the orientation of the rubber tapping robot arm according to the positional relationship between the rubber tapping location and the rubber tree incision position, so that the rubber tapping robot arm can face the rubber tree incision; vertical telescopic degree of freedom, adjust the height of the rubber tapping robot arm according to the height of the rubber tree incision, so that the rubber tapping robot arm can meet different height requirements; a horizontal telescopic degree of freedom, adjust the length according to the distance relationship between the rubber tapping robot arm and the rubber tree incision position, so that the end actuator is just at the incision position; one degree of freedom of end rotation adjusts the posture of the end actuator according to the different growth directions of the rubber tree and the state of the trunk, so that the end actuator can fix the trunk and align the incision position. Moreover, a shock absorber is installed at the joint of the rubber tapping robot arm, which can effectively reduce the vibration generated during the rubber tapping operation, and provide effective safety protection for the robot arm and the robot as a whole.

Because the reaction force is relatively large during the rubber tapping operation, in order to ensure the smooth progress of the rubber tapping operation, the present invention specially designs a tree-hugging fixing mechanism for fixing. The tree-hugging fixing device is installed at the end of the rubber tapping robot arm as an end effector. The overall design of the tree-hugging fixing mechanism adopts two identical circular arc fixing parts with a gap. The gap is larger than the diameter of the rubber tree, which allowing the trunk to enter the arc. A guide wheel is installed at the gap, because errors may occur when working in the field, the guide wheel can help to let the tree trunk enter the arc and fixed better, and can prevent mechanical damage caused by large errors. Four fixing modules are installed on an arc fixing part, and the fixing modules can expand and contract along the diameter direction of the arc fixing part until they touch the tree trunk and stop stretching after realizing the fixing effect, thereby achieving a stable fixing effect. In order to ensure the rubber tapping effect, the center of the tree trunk and the center of the arc fixing part need to coincide as much as possible, so the four fixing modules on the same arc fixing part are connected by a timing belt, so that the expansion and contraction length of each fixing module is the same. There is an arc-shaped guide rail inside the arc-shaped fixing part, and the inside of the guide rail is a gear ring, which is used to install the sliding tapping device and provides it with an arc-shaped path.

Among them, the upper and lower gears of the sliding rubber tapping device mesh with the internal ring gears of the upper and lower circular arc fixing parts respectively, and the gears can be driven by the motor to make the sliding rubber device move in a horizontal arc along the arc-shaped guide rail inside the arc fixing part, and the rubber tapping head on the sliding rubber tapping device is driven by a motor to move up and down. The above two different motion forms move simultaneously in an inclined arc-shaped trajectory in space, which is consistent with the rubber tapping cut marks, so the rubber tapping operation can be carried out. However, the slope of different tapping marks is different, and it is necessary to ensure that the direction of the tapping head is the same as that of the tapping marks, so the direction of the tapping head can be adjusted.

When the present invention works, concrete process is as follows:

1. Autonomous navigation: obtain the location information of the moving platform according to the positioning system, identify the rubber tree through the image processing system and obtain its location information, and according to the position relationship between the two, the moving platform autonomously moves to a suitable working place.

2. Robotic arm control: first adjust the height of the forearm according to the height of the incision, then adjust the overall orientation of the robotic arm according to the direction of the rubber tree, then adjust the horizontal distance according to the distance from the rubber tree, and finally adjust the posture of the execution end according to the trunk posture to ensure that the cypress tree fixture can hold the trunk to fix.

3. Preparation for cutting: place the tapping knife at the starting point of tapping. Determine the slope of the tapping trace and adjust the direction of the tapping head.

4. Cutting the bark: after the above work is completed, the rubber tapping is started, and the sliding rubber tapping device is driven to move simultaneously along the circular arc fixing track and the up and down track to realize the rubber tapping.

5. After the above steps are completed, open the fixing mechanism and repeat the above steps.

Compared with the existing alternative artificial tapping technology, the present invention can achieve the following beneficial effects:

Compared with manual hand-held rubber tapping machines, the present invention can independently perform rubber tapping operations without manual intervention, greatly reduces manual input, and significantly improves the working efficiency of rubber tapping and the efficiency of time-to-economy conversion; compared with the traditional rubber tapping machine, the tree-hugging installation type rubber tapping machine installs one machine per tree, and the overall investment is too high. The invention is a moving system that can work alone in a whole piece of rubber forest. The working area is large, which reduces the average input cost of each tree. Moreover, the end actuator of the present invention meets the technical requirements of traditional rubber tapping technology such as the cutting depth of the rubber tree, the rubber tapping consumption, and the smoothness of the cutting edge. In summary, the present invention has good promotion and use value.

DESCRIPTION OF DRAWINGS

In FIG. 2, 5—track, 6—rear drive wheel, 7 front drive wheels, 8, the first guide wheel, 9—the second guide wheel, 10, the first damping wheel, 11—the second damping wheel, 12—body, 13—first shock absorber, 14—second shock absorber, 15—third shock absorber, 16—electric rotary table.

In FIG. 3, 16—electric rotary table, 17, the first stepping motor, 21, the second stepping motor, 24—the third stepping motor, 18—connecting plate, 19—vertical sliding module, 20—sliding connector, 22—horizontal sliding module, 23—the fourth shock absorber, 25—the fifth shock absorber.

In FIG. 4, 26—connecting piece, 27—arc fixing piece, 28, first fixing module, 29—second fixing module, 30—third fixing module, 31—fourth fixing module, 301—pressing block, 302 ball head, 303 screw mandrel pulley, 304—the first screw mandrel, 32—the first pulley, 33—the second pulley, 34—the third pulley, 35—the first synchronous belt, 36—the second synchronous belt, 37—the third synchronous belt, 38—guide wheel, 39—internal gear.

In FIG. 5, 40—the 4th stepper motor, 41—the 5th stepper motor, 42—the 6th stepper motor, 43—gear, 44—manual adjustment grips, 45—tapping cutter head, 46—the second screw mandrel.

PREFERRED EMBODIMENT

Figure 1:
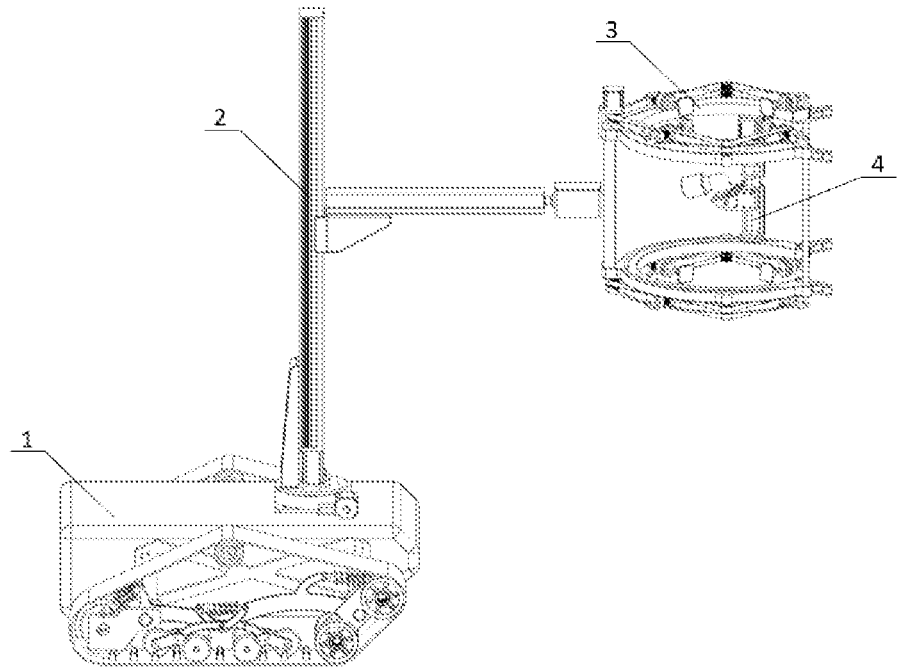
FIG. 1 is a schematic diagram of the overall system mechanism of a fully automatic intelligent tapping robot

Firstly, the present invention will be further described with reference to the drawings and embodiments.

Referring to FIG. 1, FIG. 2, FIG. 3, FIG. 4, FIG. 5. First introduce the collation structure.

The present invention is a fully automatic rubber tapping robot system includes a crawler-type mobile platform 1, which is a moving platform with a crawler structure and has a certain shock-absorbing ability, and is mainly responsible for carrying related equipment and moving between rubber forests, provides a stable platform for rubber tapping work, etc. the tapping robot arm 2 is connected with the electric rotary table 16 located on the crawler moving platform 1 through the connecting plate 18, and its structure is a four-degree-of-freedom mechanical arm with vertical rotation and expansion and horizontal rotation. The tapping robot arm 2 has four degrees of freedom of expansion and contraction, it can meet the working space requirements of rubber tapping operations. The tree-hugging fixed device 3 is installed at the end of the tapping robot arm through the connector 26, and its function is to fix the rubber tree inside the tree-hugging fixed device to ensure that the vibration during the rubber tapping operation is minimized, providing a stable working environment for the rubber tapping, and improving accuracy; the overall structure of sliding rubber tapping device 4 is a device with a rubber tapping cutter head formed by a plurality of motors. It mainly completes the rubber tapping operation after completing the preparatory work to ensure that the rubber tapping traces meet the process requirements. By the gear 43 on the sixth stepper motor 42 meshing with the wheel belt 39 on the tree-hugging fixture, it can be installed on the tree-hugging fixture and can move according to the gear belt 39 tracks.

The above descriptions are the main functions and implementation methods of the devices. The details of the present invention will be further described below in conjunction with the drawings and implementation methods of each part.

Figure 2:
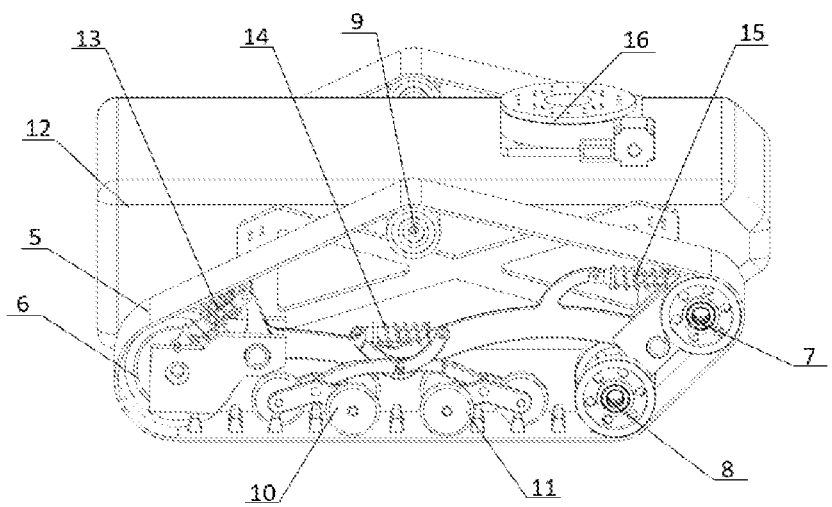
FIG. 2 is a schematic diagram of the crawler mobile chassis mechanism of a fully automatic rubber tapping robot

Referring to FIG. 2, the crawler-type moving platform 1 is a mobile platform with a crawler-type movement mode, the drive mode is four-wheel drive, and has a certain shock absorption capacity, so that the tapping robot can adapt to different rugged road conditions.

The specific working details and mechanical structure are as follows: the front drive wheel 7 and the rear drive wheel 6 jointly drive the crawler belt 5 to rotate, thereby driving the body 12 to move. The front and rear wheel drive can effectively ensure that the rubber tapping robot has sufficient driving power in the forest to ensure the overall stable operation. The first guide wheel 8 and the second guide wheel 9 rotate under the drive of the crawler belt 5 to ensure that the overall crawler belt 5 rotates smoothly, and also ensure that the crawler belt 5 is tensioned to make the rotation process of the crawler belt 5 more stable; the first shock absorber 13 is housed on the top, and the third shock absorber 15 is housed on the rotating shaft of front driving wheel 7, which can effectively reduce the vibration that produces because of driving; body 12 is also equipped with first damping wheel group 10 and the second damping wheel group 11. The second shock absorber 14 is installed between the first damping wheel group 10 and the second damping wheel group 11. The first damping wheel group 10 and the second damping wheel group 12 together with the second shock absorber 14 constitute a shock absorber structure with good shock absorbing performance, which can make the track 5 closely fit the ground and reduce the vibration caused by road bumps at the same time. The purpose of above is to ensure the stable operation of the tapping robot in the forest. The three shock absorbers can also reduce the vibration generated during the rubber tapping process to a certain extent during the rubber tapping operation. Body 12 is equipped with a GPS positioning system to perform general calibration of trees and self-position calibration. Meanwhile, the internal controller controls the crawler moving platform 1 according to the position information of the two, so that the robot can reach the designated working position.

Further, an electric rotary table 16 is installed on body 12, and the electric rotary table 16 is connected with the rubber tapping robot arm 2, so that the rubber tapping robot arm 2 has an overall degree of freedom of rotation.

Figure 3:
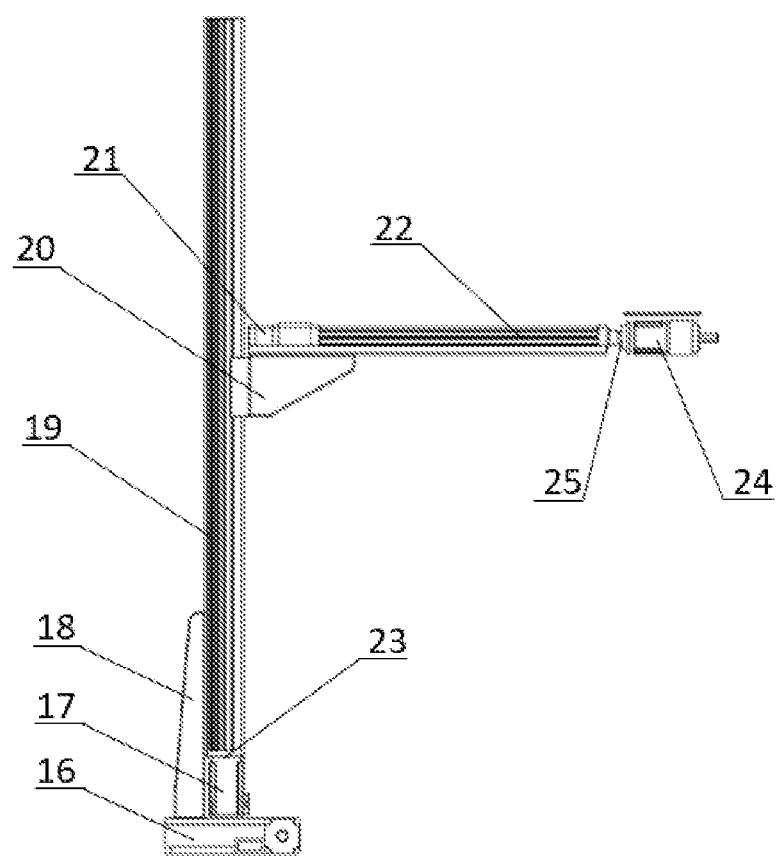
FIG. 3 is a schematic diagram of the tapping robot arm of the automatic rubber tapping robot

Referring to FIG. 3, after the rubber tapping robot reaches the target tree, it collects accurate information about the cut marks of the trees, such as the degree of inclination of the tree, the starting position of the cut marks, the end of the cut marks, the inclination of the cut marks, etc., and adjusts the rubber tapping robot arm 2 according to the above information. The rubber tapping robot arm and the electric rotary table 16 are connected through the connecting plate 18 to the electric rotary table 16 located on the crawler moving platform 1 through the connecting plate 10, so that it is installed on the crawler moving platform. The overall structure of the rubber tapping robot arm is a four-degree-of-freedom robot arm. The four degrees of freedom are vertical lifting degree of freedom, vertical rotation degree of freedom, horizontal front-back degree of freedom, and horizontal rotation degree of freedom, which can meet the working space requirements of tapping work.

The specific working details and mechanical structure are as follows: the rubber tapping robot arm 2 specifically works to adjust its own degrees of freedom so that the end actuator can reach the designated position. The rubber tapping robot arm 2 is fixed on the electric rotary table 16 through the connecting plate 18, and the rotation of the electric rotary table 16 can drive the rubber tapping robot arm 2 to rotate as a whole, so that the mechanical arm has an overall rotation degree of freedom, and the rubber tapping robot arm 2 can be adjusted to face the rubber tapping location. Further, the electric rotary table 16 is connected with the vertical sliding module 18 through the first stepping motor 17, and the rotation of the stepping motor 17 drives the screw mandrel in the vertical sliding module 18 to rotate, so that it is installed on the vertical sliding module 18. The sliding connection 20 on the top can move in the vertical direction, so that the rubber tapping robot arm 2 has a degree of freedom of vertical lifting, and can adjust the end actuator to be at the same height as the tapping position; the second stepper motor 21 is installed on the sliding connection 20, the end of the motor is connected to the horizontal sliding module 22, so that the horizontal sliding module 22 can perform horizontal telescopic movement, so that the rubber tapping robot arm 2 has a horizontal telescopic degree of freedom, and can adjust the distance between the end actuator and the rubber tapping position; the third stepping motor 24 is installed at the end of the module 22, and the tree-hugging fixed device 3 is installed at the end of the third stepping motor 24. The third stepping motor 24 can drive the tree-hugging fixed device 3 to rotate, that is, there is a horizontal rotation at the end. The degree of freedom can make the tree-hugging fixed device 3 adapt to rubber tree trunks in different growth directions. The fourth shock absorber 23 is installed at the connection between the stepper motor 17 and the vertical slide module 18, and the fifth shock absorber 25 is installed at the connection between the horizontal slide module 22 and the third stepper motor 24. The four shock absorbers 23 and the fifth shock absorber 25 can effectively reduce the impact of the vibration generated in the rubber tapping process on the mechanical arm and the overall robot.

Figure 4:
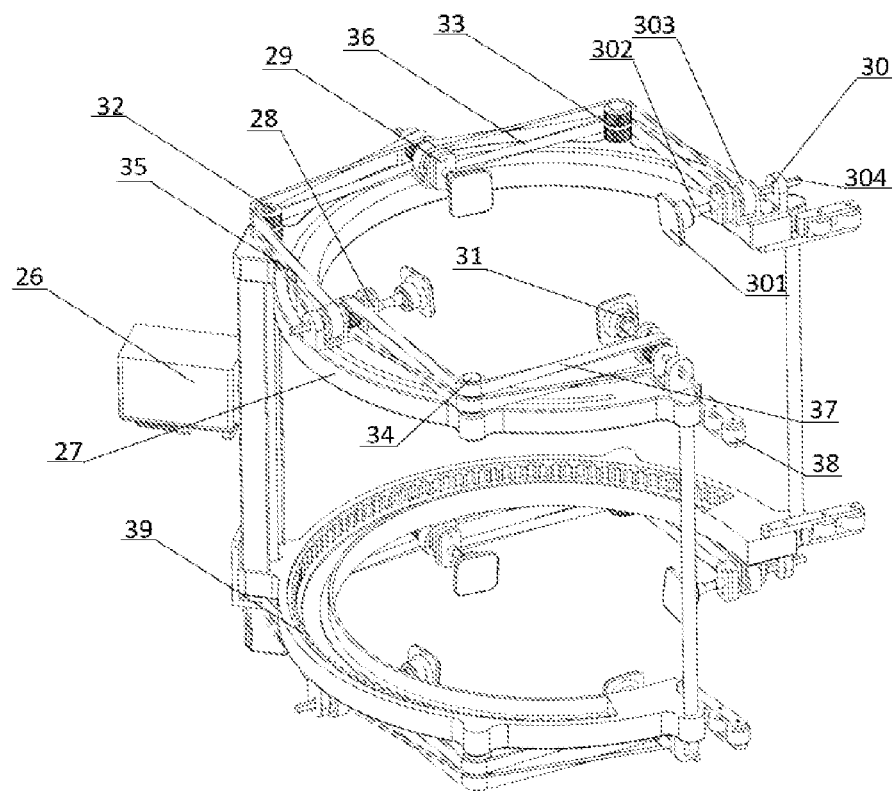
FIG. 4 is a schematic diagram of the tree-hugging fixed device of the automatic rubber tapping robot

Referring to FIG. 4, the tree-hugging fixed device 3 is connected to the end of the third stepping motor 24 in FIG. 2 through a connector 26, that is, the tree-hugging fixed device serves as an end actuator. The whole tree-hugging mechanism is a cylinder mechanism composed of two arc fixing parts 27 up and down. Its function is to stably fix the rubber tree trunk inside the tree-hugging fixed device, provide a stable working environment, and reduce the vibration caused by rubber tapping.

The tree-hugging fixed device has symmetrical mechanism up and down, and the working steps are same. Therefore, the above half parts are illustrated as examples to illustrate its main functions and implementation methods. The tree-hugging fixed device 3 and its main body are fixed by two identical upper and lower arcs with arc fixing piece 27, the gap of the circular arc fixing part 27 is larger than the diameter of the rubber tree, so that all rubber trees can be fixed. Taking the upper half of the arc fixing part 27 as an example. A guide wheel 38 is installed at the gap of the arc fixing part 27. Because there will be a certain error in information collection and overweight control of the mechanical arm, the guide wheel 38 can be used in the presence of a certain error. Under the circumstances, let the trunk enter the inside of the arc fixing part 27, thereby preventing mechanical damage caused by large errors, and can also effectively protect the tree surface and ensure the rubber tapping effect. After the trunk enters the tree-hugging fixed device 3, the four fixing modules (28, 29, 30, 31) that are evenly distributed on the arc fixing part 27 move inwardly at the same time until they touch the trunk and stop stretching after realizing the fixing effect, thereby achieve a stable fixation effect. Taking the third fixing module 30 as an example, the specific mechanisms and functions of the fixing module 30 are respectively: a pressing block 301, which directly contacts the tree trunk for its fixing and pressing effect, and it is connected with a screw mandrel 304 through a ball head 302, so that the compacting block 301 has a spherical degree of freedom within a certain range, adapting to the different surfaces of the trunk of the rubber tree. The screw mandrel 304 makes the pressing block 301 telescopically movable. Two synchronous belts 36 are connected with other pulleys, thereby guaranteeing that all fixed modules have the same degree of expansion and contraction. The specific workflow of all four fixed modules is as follows: the first pulley 32 is driven by a motor, and is connected with the screw pulley on the first fixed module 28 and the second fixed module 29 respectively by the first synchronous belt 35; the screw pulley on the first fixed module 28 is connected with the lead screw pulley on the fourth fixed module 31 by bypassing the third belt 34 through the third synchronous belt 37; the screw pulley on the second fixed module 29 is connected with the screw pulley on the third fixed module 30 by bypassing the second pulley 33 through the second synchronous belt 36. That is to say, it can be ensured that the rotation speeds of the screw pulleys on each fixed module are the same, so that the expansion and contraction lengths of each fixed module are the same at the same time.

The fundamental purpose of the above steps is to make the center of the trunk coincide with the center of the arc fixture 27, and only when the two centers coincide can achieve the best rubber tapping effect, that is, to ensure that the depth of the tapping traces on the trunk surface is the same. Further, there is an arc-shaped guide rail inside the arc-arc fixing part 27, and an internal ring gears 39 is arranged on the guide rail. It is used to install the sliding rubber tapping device 4 and make it capable of arc operation.

Figure 5:
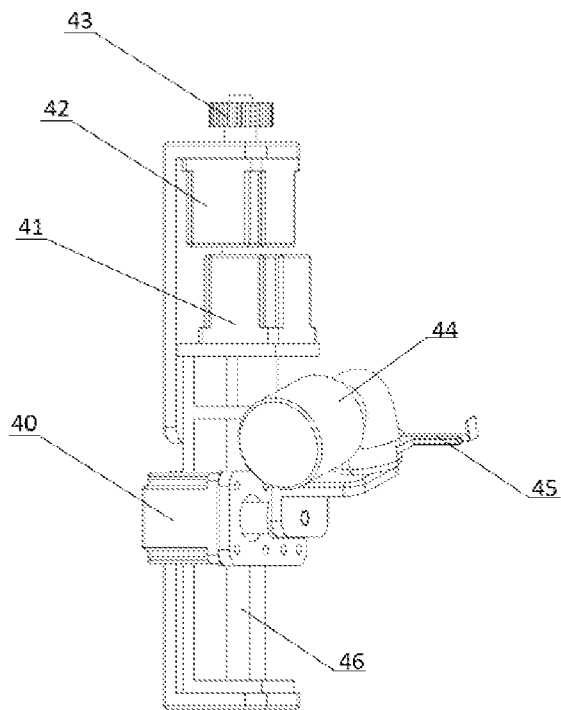
FIG. 5 is a schematic diagram of the sliding rubber tapping device of the automatic rubber tapping robot In FIG. 1, 1—crawler mobile chassis, 2—tapping robot arm, 3—tree-hugging fixed device, 4—sliding rubber tapping device.

Referring to FIG. 5, the sliding rubber tapping device 4 is composed of multiple motors, and the cooperative operation of multiple motors can actually conform to the movement trajectory of the rubber tapping operation, and the sliding rubber tapping device is equipped with a rubber tapping head to achieve the rubber tapping effect. The specific work details and mechanical structure are as follows: the sliding rubber tapping device is installed on the tree-hugging fixed device through the gear 43 meshing with the internal ring gears 39, the stepping motor 42 drives gear 43 to rotate, and gear 43 meses with internal ring gears 39 to form a drive, which can make the sliding rubber tapping device 4 as a whole move in an arc along the track of internal ring gears 39, and the stepper motor 41 can make the stepper motor 40 move up and down in vertical direction by driving the lead screw 46. Tapping knife 45 is installed on the end of stepping motor 40, which makes the tapping knife 45 move in a circular arc and move vertically up and down at the same time. Because the arc-shaped motion track and the up-and-down direction motion track are carried out at the same time, due to the superposition of the motion direction, the tapping knife 45 can move along an inclined arc-shaped track in space, and the inclined arc-shaped track coincides with the rubber-tapping trace, that is, the motion profiles can be used for rubber tapping operations. Further, the stepper motor 40 can drive the tapping knife 45 to rotate, so that the cutting edge of the tapping knife 45 can be adjusted, the direction of cutting edge is the same as the advancing direction of the tapping knife 45, thereby successfully completing the rubber tapping work. The rubber tapping marks in the same rubber forest are basically compatible, so in order to ensure the accuracy, the stepper motor 40 can only adjust the direction of the knife edge in a small range. The handle 44 can be adjusted manually.

In conjunction with the descriptions of the above-mentioned parts, when the present invention works, the specific work process is as follows:

1. Moving stage of the moving platform: the location information of the moving platform is obtained according to the positioning system, and the rubber tree is identified and its location information is obtained through the image processing system. According to the position relationship, the moving platform independently finds a suitable working place. During the moving process, the crawler-type moving platform 1 and each shock-absorbing mechanism ensure that the running process is stable.

2. Robotic arm control stage: after the moving platform reaches the designated working position and collecting relevant information on tapping traces, control the rubber tapping arm 2, and send the end actuator, that is, the tree-hugging fixed device 3 to a suitable working position. First, control the rotation of the electric rotary table 16 according to the direction of the cut marks of rubber tree, so that the rubber tapping arm faces the correct direction; according to the height of the rubber tree cut mark, control the first step motor 17 rotation, drive the sliding connector 20 on the vertical sliding module 19 to move in the vertical direction, so that the tree-hugging fixed device 3 is consistent with the height of the rubber cut mark. Then control the rotation of the second stepper motor 21 according to the rubber tapping trace and the terminal distance information, so that the horizontal sliding module 22 can be stretched horizontally, so that the rubber trunk enters the inside of the tree-hugging fixed device 3; finally, the third stepper motor 24 is controlled according to the growth direction information of the trunk, which makes the tree-hugging fixed device 3 adapt to the trunk.

3. Tree hugging fixing stage: after the trunk enters the tree-hugging fixed device 3, the trunk and the tree-hugging fixed device 3 are fixed, and the four fixed modules (28, 29, 30 and 32) uniformly distributed on the arc fixing piece 27 move inward at the same time until the tree-hugging fixed device 3 is stably fixed on the trunk and stops running.

4. The stage of rubber tapping preparation: determine the starting position of the rubber tapping trace, and place the tapping knife 45 at the starting position of the rubber tapping. Determine the slope of the rubber-tapping trace, and adjust the direction of the head of tapping knife 45.

4. Bark cutting stage: after the above work is completed, the rubber tapping is started, and the sliding rubber tapping device 4 is driven to move along the arc fixer track and the up and down track at the same time to achieve rubber cutting.

5. After the above steps are completed, open the fixing mechanism and repeat the above steps.

We claim:

1. A fully automatic intelligent rubber tapping robot, comprising:
 a moving platform and a tapping robot arm; the tapping robot arm is installed on the moving platform; an end of the tapping robot arm is equipped with an end actuator, which is composed of a tree-hugging fixed device and a sliding rubber tapping device;
 the rubber tapping robot arm adopts a four-degree-of-freedom structure and is installed on the electric rotary table on moving platform, and the overall structure of the rubber tapping robot arm is composed of a vertical and a horizontal sliding module; the rubber tapping robot arm contains four degrees of freedom, including an overall rotational degree of freedom, a vertical telescopic degree of freedom, a horizontal telescopic degree of freedom, and an end rotational degree of freedom;
 the moving platform is a crawler-type moving mode, and several shock absorbers are installed on the moving platform;
 the moving platform is equipped with a positioning and navigation system;
 the tree-hugging fixed device is installed at the end of the rubber tapping robot arm as an end actuator, and the overall design of the tree-hugging fixed mechanism is two identical belts up and down; there is an arc fixing part with a gap which is larger than the diameter of the rubber tree, and a guide wheel is installed at the gap; four fixing modules are installed on each arc fixing part, and the fixing modules can expand and contract along the diameter direction of the arc fixing part; the four fixing modules on each arc fixing part are connected by a synchronous belt, so that the expansion and contraction length of each fixing module is the same; there is an arc-shaped guide rail inside the arc fixing part, and the inside of the guide rail is a gear ring, which is used to install sliding rubber tapping device and provide it with a circular path;
 the upper and lower gears of the sliding rubber tapping device mesh with the internal ring gears of the upper and lower circular arc fixing parts respectively, and the gears can be driven by the motor to make the sliding rubber device move in a horizontal arc along the arc-shaped guide rail inside the arc fixing part, and the rubber tapping head on the sliding rubber tapping device is driven by a motor to move up and down.

2. The fully automatic intelligent rubber tapping robot according to claim 1, characterized in that: the upper and lower gears of the sliding rubber tapping device mesh with the internal ring gears of the upper and lower circular arc fixing parts respectively, and the motor drives the gear to make the sliding rubber device move along the circle, wherein the arc-shaped guide rail inside the arc fixture moves in a horizontal arc, and the tapping head on the sliding tapping device is driven by a motor to move up and down.

3. The fully automatic intelligent rubber tapping robot according to claim 1, characterized in that: the location information of the moving platform is obtained according to the positioning and navigation system, and the rubber tree is identified and the location information is obtained through image processing system; according to the position relationship, the moving platform moves to the work site independently.

4. The fully automatic intelligent rubber tapping robot according to claim 1, characterized in that: the rubber tapping robot arm first adjusts the forearm height according to the incision height, then adjusts the overall direction of rubber tapping robot arm according to the direction of the rubber tree, then adjusts the horizontal distance according to the distance of the rubber tree, and finally adjusts the attitude of the executive end according to the attitude of the trunk to ensure that the cypress tree fixing device can fix the trunk.

5. The fully automatic intelligent rubber tapping robot according to claim 1, characterized in that: place the head of cutting knife at the starting point of cutting, determine the slope of the cutting mark, and adjust the direction of the head of cutting knife.

* * * * *